(12) United States Patent
Pavlovic et al.

(10) Patent No.: US 8,571,134 B2
(45) Date of Patent: Oct. 29, 2013

(54) POLAR TRANSMITTER

(75) Inventors: Nenad Pavlovic, Eidenhoven (NL); Manel Collados, Eindhoven (NL); Xin He, Waalre (NL); Jan Van Sinderen, Liempde (NL)

(73) Assignee: NXP, B.V., Eindhoven (NL)

( * ) Notice: Subject to any disclaimer, the term of this patent is extended or adjusted under 35 U.S.C. 154(b) by 225 days.

(21) Appl. No.: 13/062,330

(22) PCT Filed: Aug. 24, 2009

(86) PCT No.: PCT/IB2009/053704
§ 371 (c)(1),
(2), (4) Date: Mar. 4, 2011

(87) PCT Pub. No.: WO2010/029454
PCT Pub. Date: Mar. 18, 2010

(65) Prior Publication Data
US 2011/0164702 A1     Jul. 7, 2011

(30) Foreign Application Priority Data
Sep. 9, 2008 (EP) ..................... 08163988

(51) Int. Cl.
*H04L 27/00* (2006.01)
(52) U.S. Cl.
USPC ............. 375/295; 375/296; 375/300; 331/17
(58) Field of Classification Search
USPC ............. 331/16, 17, 179, 182; 375/295, 300, 375/376
See application file for complete search history.

(56) References Cited

U.S. PATENT DOCUMENTS

| | | | | |
|---|---|---|---|---|
| 7,551,685 B2 * | 6/2009 | Yang et al. | ..................... | 375/296 |
| 7,750,701 B2 * | 7/2010 | Ainspan et al. | ............... | 327/159 |
| 2004/0183602 A1 | 9/2004 | Maunuksela et al. | | |
| 2005/0047520 A1 | 3/2005 | Yang et al. | | |
| 2007/0085579 A1 | 4/2007 | Wallberg et al. | | |
| 2007/0205931 A1 | 9/2007 | Vanselow et al. | | |
| 2008/0205545 A1 | 8/2008 | Rofougaran | | |

(Continued)

FOREIGN PATENT DOCUMENTS

WO    2007/005878 A1    1/2007

OTHER PUBLICATIONS

Sander, W., et al. "Polar Modulator for Multi-mode Cell Phones", IEEE 2003 Custom Integrated Circuits Conf., vol. Conf. 25, pp. 439-46 (Sep. 2003).

(Continued)

*Primary Examiner* — Leon-Viet Nguyen

(57) ABSTRACT

The present application relates to at least one digitally controlled oscillator and a data modulation device. More particularly, the digital polar transmitter comprises at least one digitally controlled oscillator configured to generate at least one frequency. The digital polar transmitter comprises a data modulation device, wherein the data modulation device comprises at least one data input terminal, at least one output terminal, and at least one frequency input terminal, wherein the output terminal is connected to the digitally controlled oscillator. The digital polar transmitter comprises a phase measuring device configured to measure phase information from the output signal of the data modulation device for every frequency sample. The digital polar transmitter comprises a phase error detecting device configured to detect a phase error at least depending on the measured phase information, wherein the phase error detecting device is configured to apply the detected phase error to the output signal of the data modulation device.

12 Claims, 4 Drawing Sheets

(56) References Cited

U.S. PATENT DOCUMENTS

2008/0309524 A1* 12/2008 Syllaios et al. ................. 341/61
2009/0262877 A1* 10/2009 Shi et al. ....................... 375/376
2010/0130143 A1    5/2010 Collados Asensio et al.

OTHER PUBLICATIONS

Staszewski, R., et al. "Digitally Controlled Oscillator (DCO)-Based Architecture for RF Frequency Synthesis in a Deep-Submicrometer CMOS Process", IEEE Trans. on Circuits & Systems II: Analog & Digital Signal Processing, vol. 50, No. 11, pp. 815-28 (Nov. 2003).

Staszewski, R., et al. "Direct Frequency Modulation of an ADPLL for Bluetooth/GSM with Injection Pulling Elimination", IEEE Trans. on Circuits & Systems: Express Briefs, vol. 52, No. 6, pp. 339-43 (Jun. 2005).

Staszewski, R., et al. "RF Built-in Self Test of a Wireless Transmitter", IEEE Trans. on Circuits and Systems II: Express Briefs, vol. 54, No. 2, pp. 186-90 (Feb. 2007).

Staszewski, R., et al. "Software Aspects of the Digital RF Processor (DRP™)", IEEE Explore, 5 pages (Sep. 2007).

International Search Report and Written Opinion for Int'l. Patent Appln. No. PCT/IB2009/053704 (Dec. 22, 2009).

* cited by examiner

POLAR TRANSMITTER

FIELD OF THE INVENTION

The present application relates to at least one digitally controlled oscillator and a data modulation device. The present application relates also to a wireless device comprising the digital polar transmitter, a method for compensating a phase error, and a computer program.

BACKGROUND OF THE INVENTION

It is an ongoing concern in modern communication systems, in particular in wireless communication systems, to provide low power consumption and to lower the analogue area. Therefore, the polar architecture can be used for implementing the transmitter.

Furthermore, it is desired to implement such a polar transmitter in a predominant manner digitally. An example of a digital polar transmitter according to prior art is shown in FIG. 1. As can be seen from FIG. 1, a phase component 2 and an envelope component 4 are the two data input signals. For instance, these signals 2 and 4 can be generated by a digital signal processor (DSP) or the like.

The envelope component 4 can be added to the signal to be amplified via the voltage supply of a provided power amplifier 10. Subsequently, a band pass filter 12 can be arranged, which comprises an output terminal 14. This output terminal 14 can be connected to suitable sending means, like an antenna (not shown).

The phase component 2 can be generated by modulating the digital phase locked loop (ADPLL). An ADPLL may encompass generally as main blocks a digitally controlled oscillator (DCO) 8 and a phase to frequency (PF) converter 6. Thereby, the time-to-digital converter may have a high speed accumulator, such as an integer converter counting the full cycles of the DCO, and a fractional converter (TDC) for measuring the fractional phase error compared to the DCO cycle.

From document US 2007/0085579 a two point modulation of the ADPLL is known. In particular, frequency samples can be applied to the ADPLL in a two point way, using a reference frequency as the sampling rate. Such a polar transmitter can be used for applications comprising a low symbol period, since in these cases the ADPLL provides enough oversampling to satisfy the Nyquist criterion for representing the modulated signal in the time discrete domain.

For other application with higher symbol rates, like wideband orthogonal frequency division multiplex (OFDM), a sampling rate higher then the usually used reference frequency is needed. The only suitable clocks with such high frequencies are provided at the output of the accumulator clocked by the DCO. A problem arises by using the DCO, since the clock has a data dependent jitter as the DCO is modulated during transition. Furthermore, since the phase is created by integrating the frequency samples, the phase error will be accumulated.

FIG. 2 shows an exemplified diagram of OFDM phase signals. The reference sign 16 indicates unwrapped phase, while reference sign 18 indicates the time axis, for instance, in μs. Furthermore, the curve 20 represents the ideal phase and the dotted curve 22 represents the phase at the output of the DCO. From this diagram, an accumulation of the phase error can easily be seen. Such an accumulation of the phase error can deteriorate the error vector magnitude (EVM) at the output of the polar transmitter.

Therefore, it is an object of the present application to provide a polar transmitter comprising at least a reduced phase error. A further object is to prevent a phase error accumulation due to modulation induced clock jitter. Another object is to improve the EVM at the output of the polar transmitter.

SUMMARY OF THE INVENTION

These and other objects are solved by a digital polar transmitter, comprising at least one digitally controlled oscillator configured to generate at least one frequency. The digital polar transmitter comprises a data modulation device, wherein the data modulation device comprises at least one data input terminal, at least one output terminal, and at least one frequency input terminal, wherein the output terminal is connected to the digitally controlled oscillator. The digital polar transmitter comprises a phase measuring device configured to measure phase information from the output signal of the data modulation device for every frequency sample. The digital polar transmitter comprises a phase error detecting device configured to detect a phase error at least depending on the measured phase information, wherein the phase error detecting device is configured to apply the detected phase error to the output signal of the data modulation device.

The present digital polar transmitter can be employed within several wireless transmitting devices. In particular, the present digital polar transmitter can be used for wideband OFDM standards.

For generating the desired high frequencies, a digitally or numerically controlled oscillator (DCO) is provided. The DCO may generate at least one frequency signal. This signal can be used for further clock-controlled components within the present polar transmitter either directly or preferably indirectly by deriving the desired frequency signal from the frequency signal being generated by the DCO. The DCO may be also configured to generate the output signal to be transmitted, wherein this signal can be forwarded to power amplifiers.

Furthermore, a data modulation device is arranged, which comprises at least one data input terminal. A data signal, like an inphase component and/or quadrature component may be generated by a suitable signal generator, like a DSP or the like, with a suitable sampling rate. In addition, the data modulation device may comprise at least one frequency input terminal, which can be used for supplying the data modulation device with the above stated sampling rate. Moreover, the data modulation device comprises also at least one output terminal. This output terminal may be a frequency output terminal and is in connection with the DCO. For instance, the output signal of the data modulation device can be applied directly to the digitally controlled oscillator. Delays during processing can be avoided.

It shall be understood that, according to further variants of the present application, the modulation device may comprise further output terminals, like an envelope output terminal. The output terminal may be arranged to connect further components, such as power amplifiers, and/or to connect further components of the present ADPLL.

In particular, the provided phase measuring device can be connected to at least one output terminal. The phase measuring device is configured measure the phase information of the output signal of the data modulation device for every frequency sample. The phase information can be forwarded to the phase error detecting device.

Contrary to expectation, it is found according to the present application that a phase error, in particular a phase error accumulation due to clock jitter of the DCO, can be prevented by arranging a phase error detecting device configured to detect the phase error at least depending on the measured phase information, wherein the phase error detecting device is configured to apply the detected phase error to the output signal. The phase error can be detected by suitable detecting means, like calculating means. Since the phase error is detected every frequency sample and applied to the phase measuring device, accumulation of phase errors can be avoided in a simple manner. The digital polar transmitter according to the present application improves the EVM at the output of the polar transmitter significantly. The present polar transmitter is particular suitable for high sampling rate frequencies and prevents data dependent jitter generated by a DCO.

Furthermore, according to another embodiment, the phase measuring device may be configured to calculate the phase error at least depending on detected phase information of the output signal of the data modulation device and a sampling clock signal derived from the digitally controlled oscillator. The error, in particular, the clock jitter error, can be calculated by using the phase difference between the output signal and a reference signal derived from the DCO. In particular, the speed up of the DCO can be known in advance and can be included into the calculation for detecting the clock jitter error, also called modulation error. By way of example, the present polar transmitter avoids that, when the DCO frequency increases due to the modulation the next edge at an accumulator output will be arrive early and a new sample will be applied.

In a further embodiment of the present application, the phase error detecting device is configured to compensate the phase error by adding the detected phase error to the next frequency sample. A phase error accumulation due to clock jitter generated by the DCO can be avoided in a simple manner.

In general, the modulation device can be formed by a cascade of signal processing blocks. According to another embodiment of the present application, the data modulation device may comprise a sampling rate converter or a transposed sampling rate converter. Such kinds of converters are especially suitable to convert a signal from an input signal rate to the channel dependent output rate.

For deriving a channel dependent data rate signal from the signal being generated by the first interpolator device in a simple manner, the data modulation device may comprise at least a transposed sample rate converter (TSRC) being arranged subsequent to the first interpolator device. The TSRC may be controlled by a suitable algorithm for obtaining a desired output data signal having a particular frequency. Also the TSRC may be a clock-controlled component.

In a further embodiment, the data modulation device may comprise at least one interpolator device comprising at least one frequency input terminal. Besides a frequency input terminal, an interpolator device may also comprise at least one data input terminal may be the data input terminal of the data modulation device. However, it shall be understood that the input terminal of the data modulation device may be also connected to intermediate devices, like storing units, and the input terminal of an interpolator device can be in communication with these devices. A first interpolator device may be an interpolator by two for duplicating the frequency of the data input signal. Such an interpolator device may be clock-controlled, wherein the clock can be derived from the DCO clock. For instance, from an input terminal having 20 MHz an output signal having 40 MHz can be created. It shall be understood that according to further embodiments, other interpolating devices can be used as well.

It may be possible, according to further embodiments of the present application that the data modulation device comprises more than one interpolator device, like a second interpolator device being arranged subsequent to a transposed sample rate converter. The second interpolator device may be similar to the first interpolating device and it can be arranged for bringing the data signal to a higher desired frequency.

Furthermore, the data modulation device may comprise at least a third interpolator device being arranged subsequent to a second interpolator device. Also this component can be arranged for increasing the frequency of the data signal. It shall be understood that, according to other variants of the present application, more than three interpolator devices and interpolator devices which may differ from each other can be provided as well.

In addition, the data modulation device may comprise a cordic device being arranged subsequent to third interpolator device. The cordic device may convert data from the IQ domain to the polar domain for further processing. It may be possible that the cordic device is clock-controlled by a high frequency, which can be derived from the DCO, such as a frequency in the range of 150 MHz. The cordic device may comprise two output terminals. One output terminal may be the envelope signal output terminal and one output terminal may be the phase signal output terminal. The phase signal can be fed to a phase to frequency converter, wherein this signal can be used as a basis for determining a phase error.

According to further embodiments, the present digital polar transmitter may comprise a high speed accumulator configured to generate at least one frequency signal depending on the frequency generated by the digitally controlled oscillator. In the field of wideband OFDM standards, a high speed accumulator, such as an integer converter, which counts the full cycles of the clock generated by the DCO, is especially suitable for deriving at least one particular frequency signal from the clock generated by the DCO. It shall be understood that the high speed accumulator can be provided for creating two or more accurate frequency signals from the clock of the DCO. The generated clocks or frequency signals can be supplied to the data modulation device.

Moreover, the digital polar transmitter according to another embodiment may comprise a first quantizer device configured to generate a first control signal for controlling the digitally controlled oscillator. By using a quantizer device, a most significant bit (MSB) can be directly obtained as a first control signal in a simple manner. Additionally, an adding device for subtracting the generated MSB from the unquantized signal can be arranged for creating an LSB.

For obtaining a more accurate control signal and control possibility respectively for the DOC, the polar transmitter may further comprise at least a second quantizer device configured to generate at least a second control signal for controlling the digitally controlled oscillator. Using both control signals improves the accuracy of the frequency generated by the DCO. In particular, the second quantizer device can be supplied with the LSB. By using a further adding device arranged for subtracting the quantized signal from the unquantized LSB, the resulting signal can be fed back. In particular, the phase error detecting device can be arranged for adding the compensating signal via an adding device to the signal being fed back.

A further aspect of the present application is a wireless device comprising the digital polar transmitter stated above. In particular, the digital polar transmitter can be implemented within large bandwidth standards, such as IEEE 802.11 a/b/g, IEEE 802.16 and IEEE 802.15, wherein the clock for polar signal generation is derived from a PLL.

Another aspect of the present application is a method, comprising supplying at least one frequency signal to a data modulation device, processing at least one input data signal by the data modulation device, supplying at least one output signal of the data modulation device to a digitally controlled oscillator, measuring the phase information of the output signal of the data modulation device by a phase measuring device every frequency sample, detecting a phase error at least depending on the measured phase information, and applying the detected phase error to the output signal of the data modulation device.

Another aspect of the present application is a computer readable medium having a computer program stored thereon. The computer program comprises instructions operable to cause a processor to perform the above mentioned method.

These and other aspects of the present patent application become apparent from and will be elucidated with reference to the following Figures. The features of the present application and of its exemplary embodiments as presented above are understood to be disclosed also in all possible combinations with each other.

BRIEF DESCRIPTION OF THE DRAWINGS

In the Figures show.

Like reference numerals in different Figures indicate like elements.

DETAILED DESCRIPTION OF THE DRAWINGS

In the following detailed description of the present application, exemplary embodiments of the present application will describe and point out an improved polar transmitter, wherein a phase error accumulation due to modulation induced clock jitter is prevented. The present polar transmitter is in particular suitable for large bandwidth standards, such as IEEE 802.11 a/b/g, IEEE 802.16 and IEEE 802.15, wherein the clock for polar signal generation is derived from a PLL.

Figure 1:
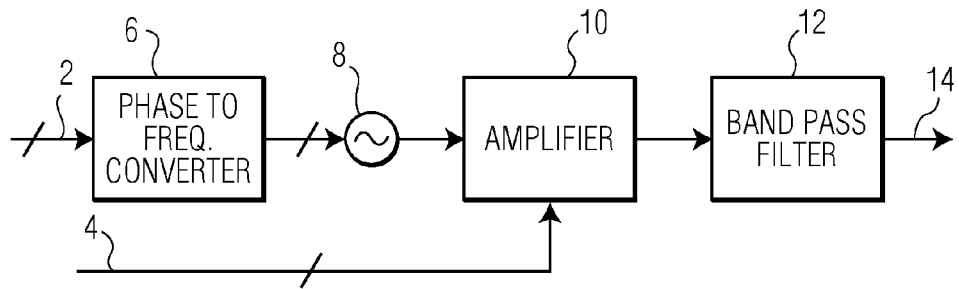
FIG. 1 an embodiment of a polar transmitter according to prior art,
FIG. 2 an exemplified diagram of OFDM phase signals according to prior art,
FIG. 3 a first embodiment of the polar transmitter according to the present application,
FIG. 4 an exemplified flowchart of the method according to the present application,
FIG. 5 a second embodiment of the polar transmitter according to the present application.
Figure 2:
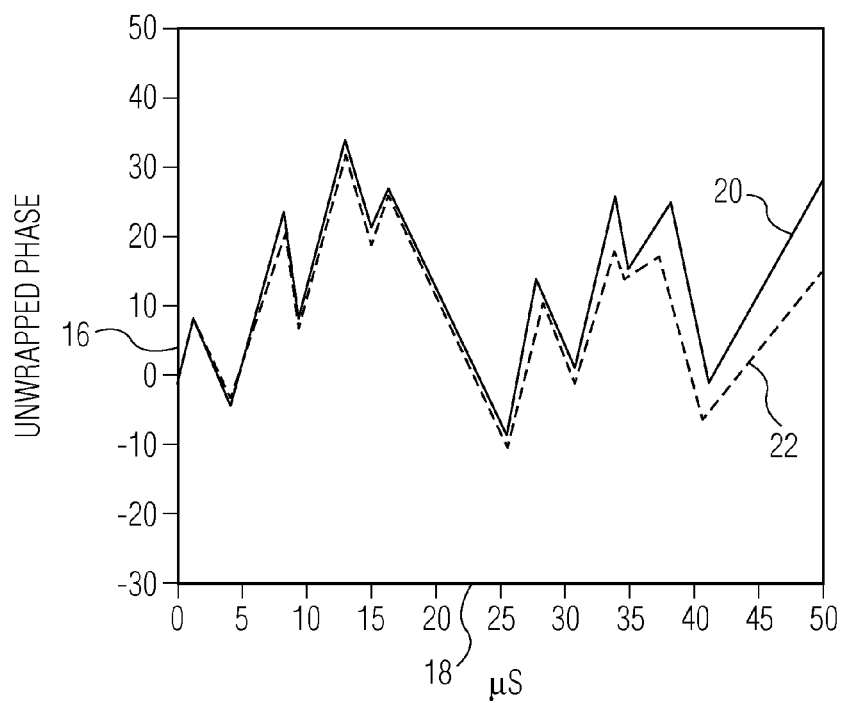
Figure 3:
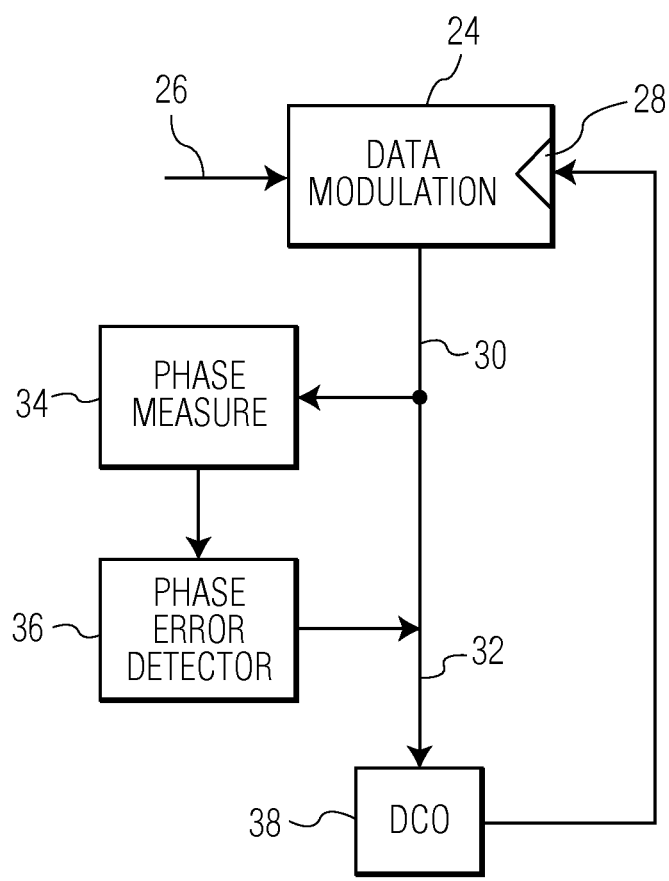

FIG. 3 shows a first simplified embodiment of the polar transmitter according to the present application. The depicted polar transmitter comprises a data modulation device 24. In turn, the data modulation device 24 comprises at least one input terminal 26 arranged for receiving at least one data input signal. In particular, an inphase component and/or quadrature component can be received from a base band signal generator, such as a DSP or the like. It shall be understood that, according to further variants, the data modulation device 24 may comprise more than one data input terminal.

In addition, the data modulation device 24 may comprise a frequency input terminal 28. This clock terminal 28 can be provided to supply the data modulation device 24 with at least one suitable frequency signal. It may be also possible, according to the present application that more than merely one frequency input terminal is provided to enable that the data modulation device 24 is supplied with different frequency signals.

The data modulation device 24 may be configured to generate an output signal 32 at terminal 30. This terminal may be a frequency output terminal. The data modulation device 24 may comprise additionally an envelope output terminal (not shown). It shall be understood that the particular realization of the modulation device may depend on the respective standard, such as such as IEEE 802.11 a/b/g, IEEE 802.16 and IEEE 802.15. The data modulation device 24 may comprise a sampling rate converter. For instance, in case the frequency of the data input signal is 20 MHz, the data modulation device 24 can be provided for generating an output signal with 150 MHz. This signal can by applied at its output terminal 30. It shall be understood that other frequency values as starting and/or end points can be predefined and may depend on the respective wideband standard.

For avoiding modulation errors, in particular, an accumulation of modulation errors, it is found according to the present application that a phase error must be determined. It may be advantageous to determine the phase error every frequency sample. Then the detected phase error can be added to every next frequency sample. More particularly, a phase measuring device 34 is arranged for measuring phase information of the output signal 32. For instance, the difference between the actual phase value and the previous phase value of the output signal 32 of the data modulation device 24 can be determined.

The result can be fed to an arranged phase error detecting device 36 configured to detect the phase error. In particular, the phase error detecting device 36 can be provided to determine or calculate the phase error at least depending on the phase information. It may be advantageous to take a reference signal into account for calculating the phase error. Preferably, a reference signal derived from the DCO 38 can be used. The detected phase error can be added to the output signal for compensating the modulation error and avoiding the accumulation of theses errors. In particular, the detected modulation error can be added to the next frequency sample. A detailed elucidation of the determination or calculation process of the compensating signal will follow subsequently.

The arranged DCO 38 is configured to generate at least one frequency signal. It may be possible that a high speed accumulator is connected between the DCO 38 and the data modulation device 24. However, the DCO 38 can be controlled by the compensating signal. The particular implementation of the blocks presented in FIG. 3 and their interconnections will be described hereinafter by the aid of FIG. 5.

Figure 4:
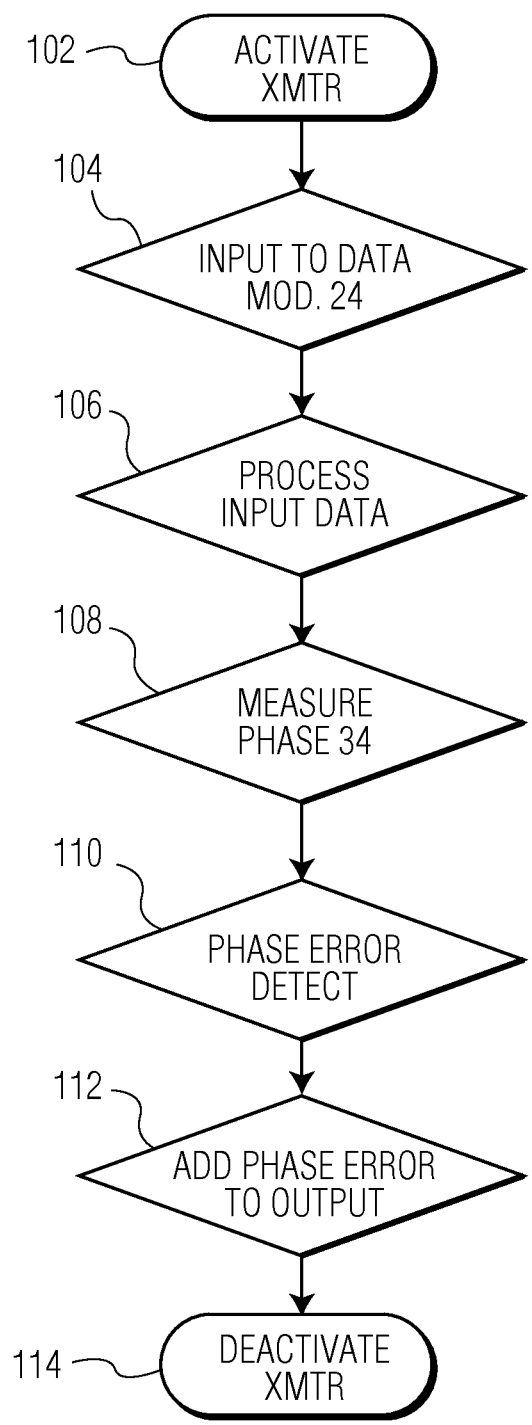

FIG. 4 shows an exemplified flowchart of the method according to the present application. After the method is started in a first step 102, for instance, by activating the wireless transmitting device comprising a polar transmitter according to the present application, the data modulation device 24 can be supplied with at least one frequency signal or clock signal (step 104). The clock signal may be generated by the DCO 38 or the clock signal may be derived from the DCO clock using suitable components, like a high speed accumulator.

Then, an input data signal can be processed by the data modulation device 24 in a next step 106. By way of example, the data modulation device 24 may be arranged to form a suitable pulse rate comprising the information to be transmitted and a desired frequency.

In addition, in a following step 108, phase information of the output signal of the data modulation device 24 can be measured by a phase measuring device 34 every frequency sample.

The measured phase information can be used to detect the phase error by a provided phase error detecting device 36

(step 110). For instance, the phase error can be calculated by using the phase information and a suitable reference signal.

In a next step 112, the detected phase error can be added to the output signal by the phase error detecting device 36 in a suitable manner. It shall be understood that the provided steps can be performed at the same time.

Finally, the present method can be terminated in a last step 114, for instance, by deactivating the wireless transmitting device or at least by terminating the transmission of data.

Figure 5:
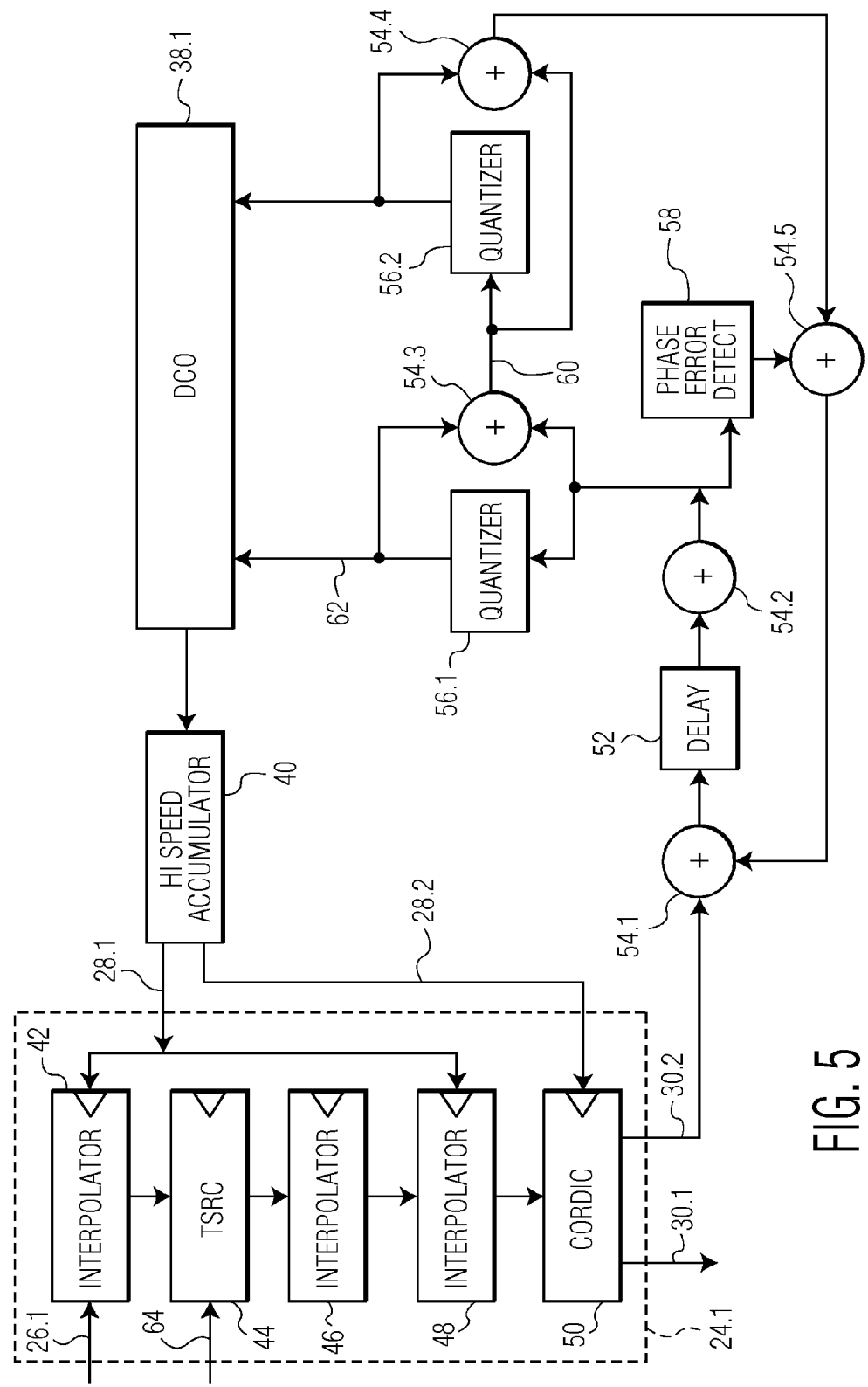

In FIG. 5, a second embodiment of the polar transmitter according to the present application is shown. The shown embodiment is a more detailed representation of the embodiment shown in FIG. 3.

The shown digital polar transmitter comprises a data modulation device 24.1, wherein the data modulation device 24.1 comprises a data process chain having five devices 42 to 50. The shown embodiment may be particular suitable for WLAN IEEE 802.11a/g. In this embodiment, the devices 42 to 50 may represent a sampling rate converter with IQ to polar conversion. Such a sampling rate converter may be configured to transform the input samples to the channel dependent data rate. The first device arranged within the data modulation device 24.1 may be a first interpolator device 42, which may receive a data signal via an input terminal 26.1. The input terminal 26.1 may be also the input terminal of the data modulation device 24.1. The received data signal may be the inphase component and/or the quadrature component generated by a DSP in dependence of the information to be transmitted. By way of example, the input signal may comprise a frequency value of 20 MHz. However, it shall be understood that other frequency values are also possible and that they may depend on the input signal generator (not shown).

The first interpolator device 42 may be an interpolator by two. In other words, the first interpolator device 42 produces an output signal having a duplicated frequency value compared to the frequency value of the input signal. According to the above stated example, the output signal may comprise a frequency of 40 MHz. It shall be understood that other kinds of interpolating devices can be also employed. In addition, the first interpolating device 42 may be clocked by a suitable frequency signal, such as a 75 MHz signal via the frequency input 28.1. A detailed elucidation of the frequency signal occurs subsequently.

The output signal of the first interpolating device 42 may be fed to a subsequently arranged TSRC 44. Also this component 44 may be clocked by the same frequency signal. Furthermore, via input terminal 64, the TSRC 44 can be controlled in a suitable manner. For instance, the TSRC 44 can be controlled by a rounding algorithm for generating a desired frequency. According to the shown example, the TSRC 44 may generate an output signal having 37.5 MHz. More particularly, the TSRC can be provided for generating a channel dependent data rate.

Subsequent to the TSRC, a second and a third interpolator device by two 46 and 48 can be arranged, wherein each of the interpolator devices 46 and 48 can be clocked by the previous mentioned frequency signal. Thereby, the second interpolating device 46 may produce a signal having 75 MHz and the third interpolating device 48 may generate a signal with 150 MHz. According to other variants of the present application, other endpoint frequencies should be generated which may cause to adapt the used devices within the data modulation device 42.1. For instance, interpolator devices can be additionally arranged or omitted or the control algorithm of the TSRC 44 can be changed. It shall be further understood that latency control between the depicted devices 42 to 50 can be performed by implementing suitable FIFO structures, which are not illustrated in the present embodiment for simplicity reasons.

This output signal can be forwarded to a suitable cordic device 50 comprising output terminals 30.1 and 30.2. The cordic device 50 may be employed for converting signals from the IQ domain into the polar domain. The cordic device may produce two signals, wherein the envelope signal can be forwarded to terminal 30.1, which can be connected to a power amplifier. The second signal can be called the phase signal and can be applied at terminal 30.2. The phase signal can be further processed by a phase to frequency converter.

The further terminal 30.2 is in connection with DCO 38.1 via further components, as described hereinafter. At first, the output signal applied at terminal 30.2 can be fed to two arranged adders 54.1 and 54.2. The first adder 54.1 may be arranged for subtracting an error signal, wherein the generation of this error signal will be explained subsequently.

The output signal applied at terminal 30.2 may be the actual phase sample $\Theta_1$, which may be delayed by a delay unit 52. In particular, the actual phase sample $\Theta_1$ can be delayed with one clock period. Afterwards, the difference between the actual phase sample $\Theta_1$ and the previous, delayed frequency phase $\Theta_2$ can be determined via the second adder 54.2. This arrangement may act as a phase measuring device. The resulting signal may be $\Delta\theta=\theta_2-\theta_1$.

This resulting signal $\Delta\theta$ is fed to a further adder 54.3, to a first quantizer 56.1 and to a provided phase error detecting device 58. The quantizer 56.1 can be provided for generating the most significant bit (MSB) 62, which can be used for controlling the DCO 38.1. The adder 54.3 is arranged for a subtracting operation to produce the LSB 60, which can be forwarded to a second quantizer 56.2 and a fourth adder 54.4.

The output signal of the second quantizer 56.2 can be additionally used for controlling the DCO 38.1. The difference signal obtained at the output of the adder 54.4 can be fed to a fifth adder 54.5. This adder 54.5 is arranged for adding the detected modulation error determined or calculated by the phase error detecting device 58. The resulting signal can be fed to the first adder 54.1 as described hereinbefore for preventing a phase error accumulation.

The DCO 38.1 may be configured to generate an output signal having a frequency of 2.4 GHz. It shall be understood that, according to other variants of the present application, a DCO may be arranged for generating different frequency signals. Subsequent to the DCO 38.1, a high speed accumulator 40 may be arranged. The high speed accumulator 40 may be an integer converter which counts the full cycles of the DCO 38.1. In the present embodiment, the high speed accumulator 40 is configured to generate the two required frequency signals having 75 MHz and 150 MHz respectively applied at the input terminals 28.1 and 28.2.

In the following, the detection of the error according to the present application will be derived. As a starting point, the equation of the frequency samples $\Delta f$ can be used $$\Delta f = \frac{\theta_2 - \theta_1}{T_{sample}} = \frac{\Delta \theta}{T_{sample}} \quad \text{(a)}$$

Thereby, $$f_{sample} = 1/T_{sample} = \frac{f_{dco}}{N}$$ (a)

is the sampling clock derived from the DCO 38.1. As described above, $\Delta\theta=\theta_2-\theta_1$ may be determined by a phase measuring device. Furthermore, the digital number $\Delta\theta$ represents the frequency sample $\Delta f$ in the normalized domain ($f_{sample}$/LSB). After the frequency sample is applied, the DCO 38.1 frequency will be $$f_{mod}=f_{dco}+\Delta f.$$ (b)

Normally, at the output of the divider edge would be produced each $T_{sample}$ period, but due to the modulation, the next edge will appear after time t, where $$\int_0^t \frac{f_{mod}}{N} dt = 1.$$ (c)

This equation c can be amended by using the equations a and b to the following equation $$t = \frac{1}{f_{sample}\left(1+\frac{\Delta\theta}{N}\right)}.$$ (d)

It is found according to the present application that the modulation error for the current frequency is given by the following equation $$\Delta\theta_{error}=\Delta f(T_{sample}-t).$$ (e)

From this equation e, the compensating signal or the error in the normalized domain can be derived resulting in the following equation $$\Delta\theta_{error} = \frac{\Delta\theta^2/N}{\left(1+\frac{\Delta\theta}{N}\right)}$$ (f)

As explained above, this compensating signal $\Delta\theta_{error}$ can be added to the next frequency sample. An accumulation of phase errors can be prevented. It shall be understood that, according to further variants of the present application, any error due to quantization (equation a) can be added to the next frequency sample.

Furthermore, it is readily clear for a person skilled in the art that the logical blocks in the schematic block diagrams may at least partially be implemented in electronic hardware and/or computer software, wherein it depends on the functionality of the logical block to which degree a logical block is implemented in hardware or software. The presented logical blocks may for instance be implemented in one or more digital signal processors, application specific integrated circuits, field programmable gate arrays or other programmable devices. The computer software may be stored in a variety of storage media of electric, magnetic, electro-magnetic or optic type and may be read and executed by a processor, such as for instance a microprocessor. To this end, the processor and the storage medium may be coupled to interchange information, or the storage medium may be included in the processor.

The invention claimed is:

1. A digital polar transmitter, comprising:
   at least one digitally controlled oscillator configured to generate at least one frequency,
   a data modulation device,
   wherein the data modulation device comprises at least one data input terminal, at least one output terminal, and at least one frequency input terminal,
   wherein the output terminal is connected to the digitally controlled oscillator,
   a phase measuring device configured to measure phase information from the output signal of the data modulation device for every frequency sample, and
   a phase error detecting device configured to detect a phase error at least depending on the measured phase information,
   wherein the phase error detecting device is configured to apply the detected phase error to the output signal of the data modulation device; and
   a first quantizer device configured to generate a first control signal for controlling the digitally controlled oscillator.

2. The digital polar transmitter according to claim 1, wherein the phase error detecting device is configured to calculate the phase error at least depending on the measured phase information of the output signal of the data modulation device and a sampling clock signal derived from the digitally controlled oscillator.

3. The digital polar transmitter according to claim 1, wherein the phase error detecting device is configured to compensate the phase error by adding the detected phase error to the next frequency sample.

4. The digital polar transmitter according to claim 1, wherein the data modulation device comprises at least one of:
   a sampling rate converter, and
   a transposed sampling rate converter.

5. The digital polar transmitter according to claim 1, wherein the data modulation device comprises at least one interpolator device comprising at least one frequency input terminal.

6. The digital polar transmitter according to claim 1, wherein the data modulation device comprises a cordic device configured to convert data from the IQ domain to the polar domain.

7. The digital polar transmitter according to claim 1, further comprising a high speed accumulator configured to generate at least one frequency signal depending on the frequency generated by the digitally controlled oscillator.

8. The digital polar transmitter according to claim 1, further comprising at least a second quantizer device configured to generate at least a second control signal for controlling the digitally controlled oscillator.

9. The digital polar transmitter according to claim 1, wherein the phase measuring device is configured to detect a difference between two adjacent frequency samples.

10. A wireless transmitter comprising the digital polar transmitter according to claim 1.

11. A method, comprising:
   supplying at least one frequency signal to a data modulation device,
   processing at least one input data signal by the data modulation device,
   supplying at least one output signal of the data modulation device to a digitally controlled oscillator,
   Controlling the digitally controlled oscillator with a quantizer device configured to generate a control signal;

measuring the phase information of the output signal of the data modulation device by a phase measuring device every frequency sample, detecting a phase error at least depending on the measured phase information, and applying the detected phase error to the output signal of the data modulation device.

12. A non-transitory computer readable medium having a computer program stored thereon, the computer program comprising instructions operable to cause a processor to perform a method according to claim 11.

* * * * *